INVENTORS
André DEBROUX
Clement GREEN
Herve D'HOOP
BY
ATTORNEYS

April 11, 1967 A. DEBROUX ETAL 3,314,050

AD-DA COMPUTER LINKAGE SYSTEM

Filed July 24, 1963 3 Sheets-Sheet 2

INVENTORS
Andre DEBROUX
Clement GREEN
Herve D'HOOP
BY
ATTORNEYS

AD-DA COMPUTER LINKAGE SYSTEM

INVENTORS
André DEBROUX
Clément GREEN
Hervé D'HOOP
BY
ATTORNEYS

United States Patent Office 3,314,050
Patented Apr. 11, 1967

3,314,050
AD-DA COMPUTER LINKAGE SYSTEM

André Debroux, Clément Green, and Hervé D'Hoop, Varese, Italy, assignors to Communaute Europeenne de l'Energie Atomique—Euratom, Brussels, Belgium Filed July 24, 1963, Ser. No. 297,283
Claims priority, application Great Britain, Aug. 7, 1962, 30,250/62
7 Claims. (Cl. 340—172.5)

Figure 1:
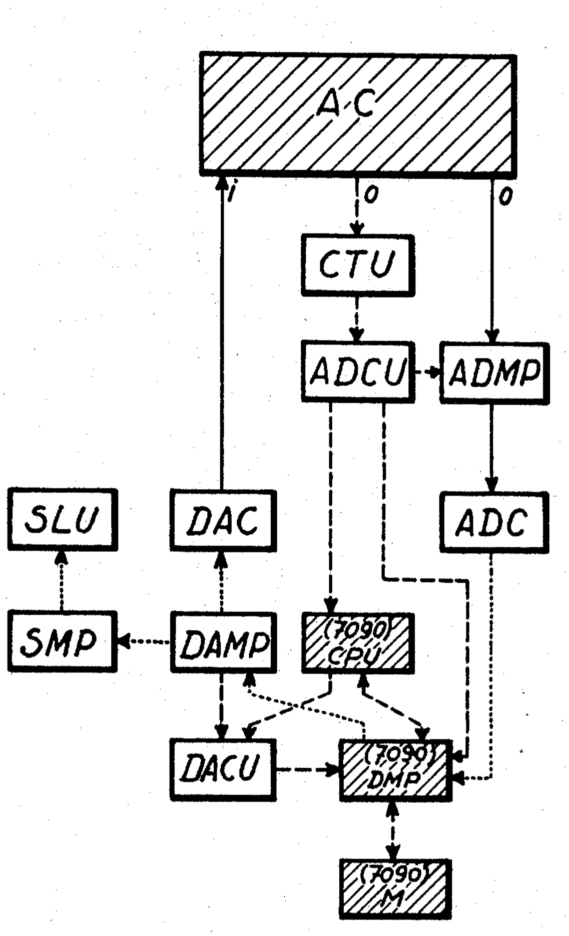

This invention relates to analogue-to-digital and digital-to-analogue computer linkage systems.

Analogue-to-digital and digital-to-analogue computer linkage systems are generally designed to link together analogue and digital computing machines to form a hybrid for the solution of problems. It is required, that the linkage system permits the utilization of the best features of both computers, namely those of the analogue machine with its rapid solution of differential equations combined with those of the digital machine with its extensive memory facilities, and its high speed programmable arithmetic capacity.

The hybrid concept has been tackled from several points of view ranging from the consideration of the digital machine as a generator of functions attached to the analogue machine, to the use of the analogue computer as a supplementary arithmetic unit within the digital machine. The aim is to amalgamate within one machine group the advantages of parallel arithmetic applied to the continuous variable as found in the analogue machine, with the permanent memory, stored programme and logical decision properties and potentialities of the digital machine.

A first step in this direction was the introduction of the APACHE system in the EURATOM Joint Research Centre, Ispra, Italy, where at present an IBM 7090, an IBM 1401 and an IBM 1620 machine as the digital section and the Electronic Associates PACE 231-R machines with "ADIOS" system as the analogue section are in use. The ADIOS-system (Automatic Input Output system) enables the potentiometer setting, machine operation and read-out to be controlled from punched paper tape, while the APACHE system enables one to execute automatically on a digital machine, a series of operations necessary before study of a physical problem on the analogue computer. For more details of the APACHE (Analogue Programming and Checking) system see "APACHE—A breakthrough in analogue computation," Proceedings of the IRE, October 1962. The full APACHE process already rends the analogue-digital grouping a hybrid with the problem solution entirely analogue but with autocoding facilities provided by the IBM 7090 digital computer. A preferred application of the linkage system described hereafter is therefore the coupling of an IBM 7090 digital computer with PACE 231 R analogue computers with the provision of twenty channels of dynamic conversion in each direction when computing.

A linkage system for the above described kind of hybrid comprises of course analogue-to-digital and digital-to-analogue converters (hereinafter referred to as A-D and D-A converters) for the analogue output and input side, multiplexers for sampling the analogue outputs to the A-D converters and redistributing digital data to the D-A converters, and buffers on both sides of the analogue computer to match different conversion times, all devices being adequately connected to the digital unit and controlled by both the digital and analogue machines.

Such linkage will have to realise the most economical use of date transmission, ensuring the best operating economy in the use of the digital computer, that is to say, adapt itself to suit the information band-width of incoming signals, and making best use of the possibilities of large digital computer (as the IBM 7090). The below described linkage system fulfil these requirements and assures 0.01% accuracy with minimized sampling rates.

The first step in this direction is characterized, according to the present invention, in that in special cases the digital computer, processing on any programme, is called for intermediate work on an analogue problem, only when required by the output of the analogue computer, and further, that the sampling speed on each channel is automatically adjusted as a function of the requirements of that channel. In oher terms, the known synchronous type of a linkage is replaced by an asynchronous linkage, whose input sampling rate is keyed to the information content of the input signal on each individual channel. Hereby advantage is taken of the fact, that average demands are always less stringent than maximum demands.

In particular, the analogue output signal is arranged to vary between a lower and upper limit, set by the digital computer, and promotes interventions of the linkage, when it exceeds one of the limits. This solution adapts very well to a further step provided by the invention for improving the hybrid's performance.

The second step is characterized according to the invention in that in addition to the asynchronous functioning, linear interpolation in the digital to analog conversion stage for function generation and delay simulation is provided, the interpolation limits corresponding to the upper and lower variable limits. The general effect of this is, that more comprehensive data is output at less frequent intervals.

Both, asynchronous functioning and interpolation may be applied in this linkage separately or together. In the system described here, both methods are utilized simultaneously.

The sampling speed is adjusted by appropriate triggering in the analogue branch of the linkage. Adjusting is easily possible with an IBM 7090 digital computer because of the relative independence of its basic units, central processing unit (CPU), multiplexer, core storage, and data channels. This is used in the normal operation of the 7090 to permit simultaneous processing by the CPU and the data channels with each working at its own rhythm. As the 7090 has an addressable interrupt feature, it can be time shared between a normal digital programme and a linkage application. The linkage thus remains permanently in operation, provided that it interrupts the digital programme only when necessary. When the interrupting programme is completed, control is restored to the original programme or directed to another programme.

Summarising, the linkage arranges that action involving the IBM 7090 is only taken when the upper and lower limit of the analogue variable is touched, i.e. when the current interpolation on any of the twenty channels becomes invalid. Further, all control facilities and condition setting is automatic, so that the entire system is under command of the 7090 and hence is submitted to the APACHE code.

As already mentioned, the linkage system comprises a multiplexer in the analogue-digital branch of the linkage (ADMP), that is to say, between the analogue computer output and the A-D converter tied to the digital computer, and a multiplexer in the digital-analogue branch of the linkage (DAMP), that is to say, a multiplexer feeding the D-A converter of the analogue computer input.

Now, as to the linkage and its organisation itself, it is according to the invention, characterised in that the digital computer section, consisting of the Digital Multiplexer (DMP) with the Central Processing Unit (CPU) and the Memory (M), is interconnected within the digital data flow path between the A-D Converter (ADC) and the D-A Multiplexer (DAMP) and that there is provided an A-D and a D-A Control Unit (ADCU; DACU), the first of which is connected, preferably over Control Triggers (CTU), to the Analogue Computer (AC) outputs and controls the A-D Multiplexer (ADMP) with A-D Converter Unit (ADC), the Central Processing Unit (CPU), and the Digital Multiplexer (DMP) (data input), the second of which is interconnected over the Digital Multiplexer (DMP) and D-A Linear Interpolating Converters (DAC) to the Analogue Computer (AC) inputs and controls the Digital Multiplexer (DMP) output side but is controlled by the D-A Multiplexer (DAMP) and the Central Processing Unit (CPU), the latter, and the Memory being constantly in mutual control connection over the Digital Multiplexer (DMP), which is connected to the D-A Multiplexer (DAMP), and that there are interlocks between the DA- and AD-control units and the digital computer section to assure groupwise data transfer.

The linkage procedure in the hybrid is that the information relevant to a given digital programme will be passed from the A-D Converter directly to the 7090 Multiplexer and hence to a predetermined group of successive locations in core storage common to all converter channels. When a complete information group has been stored, an interrupt signal is sent to the 7090–CPU which enters the appropriate programme, the first step of which is to transfer the contents of the input stores so as to leave them free for the next input to take place during processing. The results of the processing are similarly stored in a known sequence of storage locations and will include all necessary addressing and output format. The last step of processing is to set in motion the Output Control Unit (OCU) which will automatically extract the stored data, word by word, address it to its destination and reset itself at the end of a data transmission.

Figure 2:
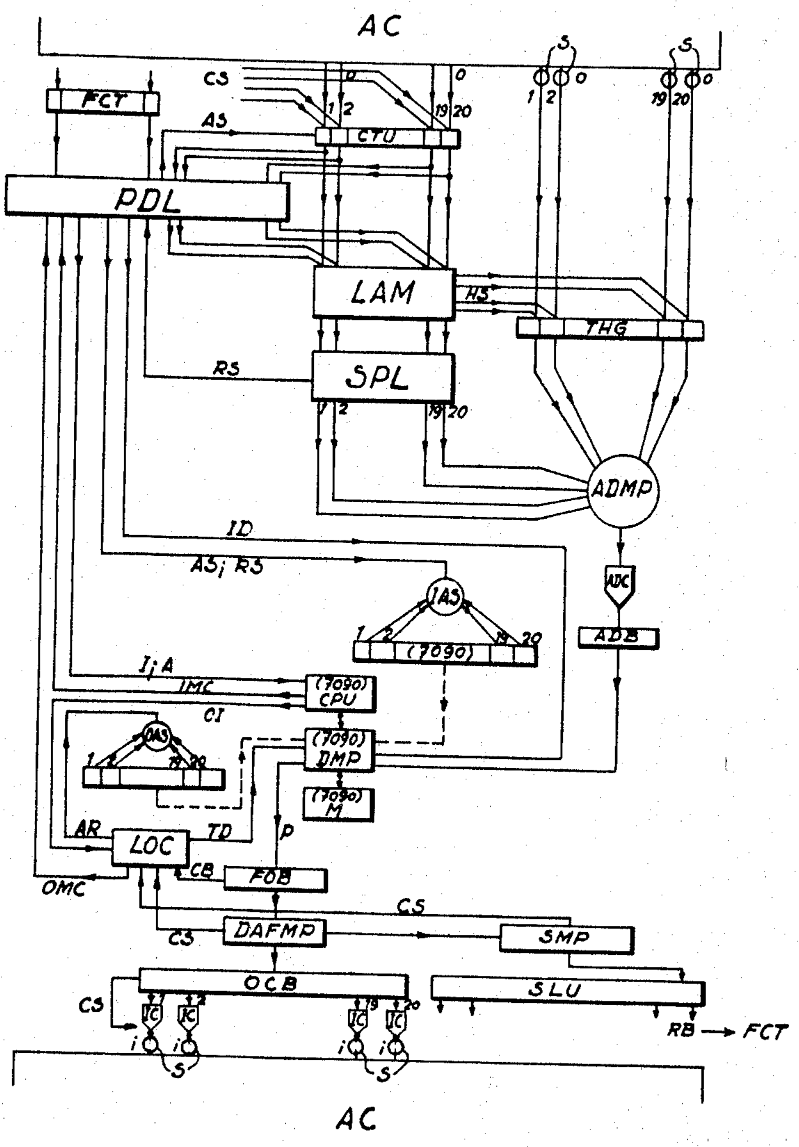
Figures 4, 5:
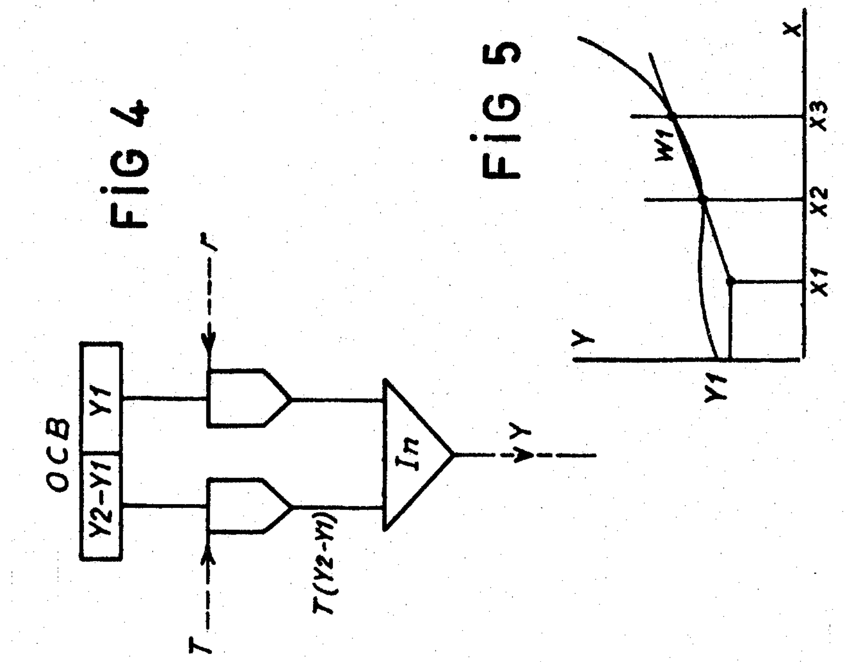
Figure 3:
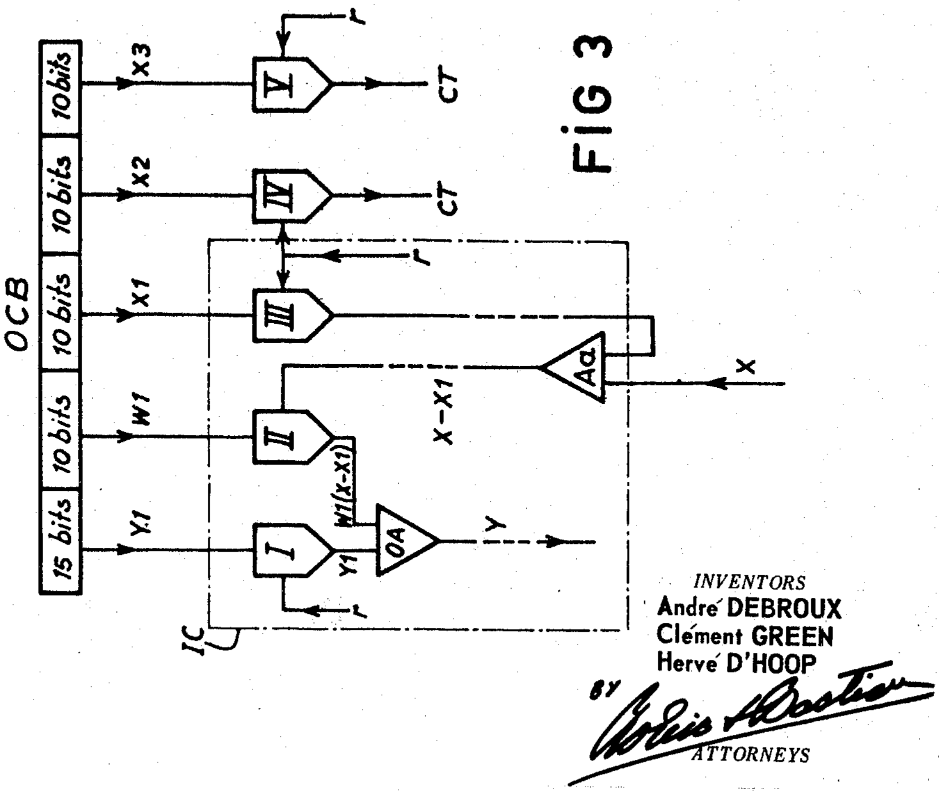

The invention will now be described by way of example only with particular reference to the accompanying drawings wherein:

FIG. 1 is a simplified functional block diagram of the linkage system governing the hybrid, FIG. 2 is a more detailed operation diagram of the linkage system, applied to an IBM 7090 digital computer, FIGS. 3 and 4 are functional block diagrams of the D-A converter stage in a preferred interconnection mode and FIG. 5 is an explanatory diagram of the function of the D-A converter stage of FIGURES 3 and 4.

In FIG. 1 the hatched fields indicate the analogue and digital units to be linked; AC being the Analogue Computer as a whole and CPU, DMP and M the most important parts of the digital computer for linkage purposes. As already indicated, CPU is the Central Processing Unit, DMP the Digital Multiplexer and M the Memory of the digital computer. Number 7090 in parenthesis in the hatched fields indicates that the operational features of the digital units should be comparable with those of an IBM 7090 digital computer.

The control frame work of the linkage system comprises two control units: the Analogue-Digital Control Unit (ADCU) for the automatic adjustment of the sampling speed on each channel, controlling the A-D Multiplexer (ADMP) with A-D Converter Unit (ADC), the CPU and the Digital Multiplexer (DMP), and the Digital-Analogue Control Unit (DACU) controlling the Digital Multiplexer (DMP) too and being controlled by the CPU. The A-D Converter Unit consists here of only one converter.

The DMP operates on the Digital-Analogue Multiplexer DAMP, which is preferably a Fast Multiplexer. The multiplexer relays processed data to the D-A Converters (DAC), which preferably are interpolating converters, and feeds the Slow Multiplexer (SMP) which operates the Static Linkage Unit (SLU). Detailed explanation as to why the units cited have been chosen is given hereinafter.

Full lines in FIG. 1 indicate linkage lines carrying analogue data, dotted lines carry digital data and dashed lines carry control signals. Reference *o* indicates the analogue outputs, *i* indicates analogue inputs.

There is still one important linkage unit to be mentioned; viz the Control Trigger Unit CTU in the A-D control loop. These control triggers are the basic elements of the A-D control branch as chosen in this example of linkage system. They attribute to the linkage a dynamic and asynchronous character. The conversion is thus not incited and controlled by a regular rigid clock but by the analogue computer and its control loop in the linkage. The principal idea for inciting the dynamic functioning of the linkage consists in the adoption of a fixed upper and lower limit for the analog variable, between which the variable is allowed to vary. But when the variable touches one of these limits, the linkage accepts the variable and the digital computer section is caused to process on the "analog" programme. In the example chosen, the Control triggers control the A-D Multiplexer (ADMP) on the basis of the upper and lower limit, which on its turn is continuously controlled by the digital computer.

The adoption of this asynchronous command entails the provision of a priority system in case several channels demand attention simultaneously, and also a delay line to relate the time of acceptance of the Control Trigger signals with the converter cycle. This is needed because the A-D channels are multiplexed to a single fast converter. The useful speed of this converter can be estimated from the processing capacity of the 7090 which is approximately on an average 10,000 intervention programmes per second. The converter cannot usefully run much faster than this whatever the number of channels used.

The advantage of asynchronous operation is not only economy but also accuracy, especially in the matter of frequency response, since the data rate in each channel is continuously adjusting itself to the highest frequency contained in its input up to a theoretical maximum of 1 k./c. This accuracy will be held until the average number of transfers demanded exceeds the permissible rate for a sufficiently long time to saturate the system, whereas in a synchronised system the accuracy drops off steadily and rapidly without any possibility of a warning indication being given.

The method of operation of the linkage system will now be described in detail with reference to the block diagram of FIG. 2.

*The analogue-to-digital control*

In FIG. 2, the analogue variables are applied to the Track and Hold Gate Unit THG and are also supplied to the Control Trigger Unit CTU, which has previously been set up by the digital machine. If one of the analogue signals exceeds either of its limits, the respective control trigger of CTU will fire, signalling both the Linkage Addressing Matrix LAM and the Priority Delay Line PDL. The LAM is a matrix of up to 20 x 20 coordinates in size, set up by programme or manually before the problem is run through. It relates each incoming signal to a group of from 1 to 20 outputs.

The trigger signal thus arrives at a group of track and hold gates which staticize the appropriate channels (hold signals HS at LAM trigger signal outputs). For the sake of example the number of control triggers is 20 but in general a smaller number will suffice.

The PDL has a cycle dependent upon the time for multiplexing and for converting one signal by the ADMP and ADC, and at the beginning of each cycle selects the trigger signal of highest priority according to the numerical order of the triggers. A signal once selected retains top priority for the respective channel as long as a repeater signal RS, emitted from the Second Priority Line SPL at the PDL, lasts. The PDL cycle ceases if no triggers are on and recommences immediately on the arrival of the next trigger signal.

When a channel signal is output from the PDL, it traverses the same path in the LAM as the corresponding trigger signal, but as a different form is attributed to it, it affects only the SPL and not the THG unit. When the SPL receives a single channel-signal it is transmitted in this channel to the AD-multiplexer ADMP which it routes via the same channel to the A-D converter ADC. If two or more channel signals arrive simultaneously, then only the first will be passed and will then be inhibited at the passage of the next signal. The repeater signal is then turned on and causes the DPL to repeat the same channel until finally there is only one signal left. At this stage all inhibiters are cancelled and the next information group is accepted. Thus the PDL determines the priority of a group of channels and the SPL the priority of a channel within a channel group.

Data passed to the AD converter is immediately converted and passed in serial form (15 bits) into the A-D Buffer ADB. The address to which group data is to be sent in the 7090 memory is taken from a fixed table of up to 20 addresses, each of 15 bits. These addresses have no significance for the linkage programme, and thus must not be programme set. It is possible to retain a certain group of addresses in absolutely permanent form, but this is undesirable from the point of view of production planning since the linkage programme must be compatible with the largest possible range of digital programmes which may thus be run simultaneously.

Accordingly it is best to set the first 10 digits of the address group by a set of manual switches and to have the last five digits permanently wired to give the numbers from 0 to 19.

It should be noted here that the quantities feeding the Control Triggers and those feeding the A-D Converter are not necessarily the same nor in one to one correspondence. In fact in the system described one Trigger causes the conversion of a group of from one to twenty analogue signals which must, however, always be converted in the same order in order that the digital programme be able to identify the quantities found in storage. It is this feature which demands a group of input addresses rather than a single one. The correspondence remains, however, between each Trigger and its "analogue" processing programme.

When the PDL has passed a sufficient part of its cycle to permit the A-D buffer to be filled (1 word), the moment arrives to call the Digital Multiplexer DMP for intermediate processing. The PDL sends an Intervention Demand ID (a continuous signal) to the DMP of the 7090, which is accepted, when the multiplexer is ready (about 1 microsecond). The multiplexer then interrogates the selected 7090 address and the data register of the Input Address Stepper IAS and stores the data in the appropriate position of the 7090 memory M. The IAS is controlled (advance or reset signal AS, RS) by the PDL.

As long as the Intervention Signal lasts, the PDL passes no more conversion control signals. Whenever the PDL receives a repeater signal, an advance signal AS is passed at the end of the cycle to the Input Address Stepper IAS, thus causing the data of one group to be stored in successive 7090 locations. If there is no repeater signal RS from the SPL, the IAS is reset (signal RS) by the PDL and an Interrupt Signal I is sent by the PDL to the Central Processing Unit CPU of the 7090 to call the CPU into action for the "analogue programme." This interrupt signal remains until the operation in progress is completed (a few microseconds). When the operation is ended the signal is accepted and control is passed to the instruction indicated by the interrupt signal I and the CPU enters in the corresponding processing programme.

Theer are two interlocks here which can stop operation. The first is the non-generation of the interrupt signal I by the PDL if the PDL has not received the Output Memory Clear Signal OMC of the preceding data transfer, and the non-generation of the signal ID by the PDL if the PDL has not received the Input-Memory Clear Signal IMC of the preceding group.

There are a few additional features on the A-D side. The first is the existence of a group of about 10 Functional Control Triggers FCT connected to the PDL, which generate Interrupt Signals for programmes requiring no input from the analogue machine. These triggers will be required for such functions as plotting of digital data.

Secondly, it is desirable to have at each of the 20 analogue outputs a multiposition mechanical switch *s* set or stepped by programme, enabling the automatic selection of variables for conversion in static functioning. One could take 8 or 10 positions per channel according to the type of switch proposed.

Thirdly, for functions of the transport delay type, an additional delay integrator is required, before the control voltage can be fed to the control triggers, since the rate of transport is the function appearing as a problem variable. This integrator will feed the control triggers directly and for this application the control trigger limits will be symmetrical and pre-set. The transport rate must be made available with both signs and the input to the integrator will be switched whenever the control trigger fires.

Fourthly, for certain functions the control of an accurate clock is necessary, e.g. in iterative calculations. It is best to incorporate the clock directly into the PDL, by-passing the triggers.

*The digital-to-analogue control*

When the CPU has completed its processing on the analogue programme, it stores the data to the output in a set of consecutive locations, determined by manual setting up as in the case of the input. The locations will be selected sequentially by the Output Address Stepper OAS, which functions in almost the same manner as the IAS. This implies that if overwriting is to be avoided, the Output Memory Clear Signal of the linkage Output Control LOC to the PDL must be sent before a new Interrupt signal to the CPU can be admitted. Thus the time required by the output device to clear these memories must be added to the digital processing time in calculating the effective data rate. This can be avoided if a double set of output stores be used. Each digital programme must then respond to a common subroutine, and the OAS must be a circular device with two reset points. This will not be necessary if the output can be made fast enough.

At the end of the processing programme an Output Initiation Signal OI of the same type as that used for calling the 7090 channels into operation is sent from the CPU to the Linkage Output Control LOC. The digital computer will transfer to its next operation immediately after this signal is sent; its intervention for the analogue programme thus being ended. If the LOC is not ready it remembers the signal and obeys it as soon as it is free. This system keeps free the most expensive unit, namely the 7090, for the maximum time.

The LOC then sends a Transfer Demand signal TD to the 7090 Multiplexer DMP which, when ready, permits the passage of information (36 bits) from the address shown on the OAS to the First Output Buffer FOB (line P). In the FOB, information is examined for the presence of the continuation bit, signifying that the transmission of a group of outputs is not yet completed. If the continuation bit CB is present, the LOC will send another Transfer Demand as soon as it is free and will also cause the OAS to step. If there is no continuation bit, the OAS will advance to react position (signal line AR from LOC to OAS).

Information in the First Output Buffer will be immediately passed to the D–A Fast Multiplexer DAFMP, which will route it to the appropriate Output Converter Buffer OCB or to the Slow Multiplexer SMP. The address is to be transferred as part of the data. As soon as the data is established in the appropriate buffer the LOC is released, for instance by a time delay in the case of data, which does not pass through the Slow Multiplexer, but otherwise by a signal. Data reaching the Output Converter Buffers will be converted to analogue from by the Interpolating Converters IC, the Convert Signal CS being contained in the data transmitted by the Fast Multiplexer.

The Slow Multiplexer will be used to fulfil all the static set-up functions of the linkage (Static Linkage Unit SLU) and in most cases the units in question will in fact act as buffers.

As to the utilization of Interpolating Converters it can be shown, that for a given accuracy, say 0.01%, the number of values required to pass a sine wave of a given frequency for a converter giving step changes in output will be nearly 300 times greater than for an interpolating system. Thus the frequency response is augmented. Accordingly the latter method has been chosen and functions according to the relation $$Y=Y1+W1(X-X1)$$

where X1, Y1 is a point of a line of which the segment chosen represents the curve of an analogue value in a given region, and W1 is its slope at that point; see FIGURE 5. Note that X1, Y1 is not necessarily a point of the curve. The region of validity must then be defined by two limits, in general X2, X3.

It is evident that this form entails the transfer from the digital machine of the five quantities X1, Y1, W1, X2 and X3, since otherwise Y will follow all its variations. The apparent redundancy of the form chosen is due to the necessity of maintaining the multiplicative term as a correction term for the accuracy of the system.

It might at first sight be supposed that the transfer of five values rather than one would reduce the advantage of the much smaller number of transfers from the digital machine by a similar factor, but consideration of the type of programme to be carried out by the IBM 7090 reveals that this is not the case.

There is another point to be mentioned here. Linear interpolation at the DA converter side of the hybrid corresponds exactly with the function of the Control Trigger Unit CTU mentioned above, as AD conversion channels are fed only when the signal reaches one of the two limits.

Perhaps the most telling argument in favor of the asynchronous organisation is the ease with which all problems of static set up of the analogue computer can be solved within its frame-work. It is clearly feasible to include among the output buffers a large number which do not feed D–A converters but other types of equipment. These need not work at high speed and may therefore economically incorporate a low speed multiplexing stage, but can be addressed by the same system as the high speed buffers.

The layout of the converter stage is further described in detail below.

The Static Linkage Units SLU in FIG. 2 will include:

The Linkage Addressing Matrix and D–A converter modes,

Linkage input and output selectors,

The ADIOS system, data and controls,

The Analogue machine modes and other controls for several machines,

A group of digital potentiometers (relays switching in standard registers),

The eventual automatic patching system,

A group of relays for logical control of the analogue consoles (not with automatic patching) and Data plotter controls.

In every case the Fast and Slow Multiplexers will signal the LOC when the data has been made ready (Buffer Clear signal CS). This will enable the 7090 to pass set up information in batches, which will be interpreted at the rhythm of the receiving device.

To call the 7090 at the end of an information group leaving the 7090, a Recall Bit RB must be provided to fire a Functional Control Trigger FCT.

The control interlocks to the PDL on the D–A side are, as already mentioned, the Output Memory Clear signal OMC, sent from the LOC, and the clearing of the Transfer Demand TD, also the final Buffer Clear signals. In addition to this, both A–D and D–A sides should interlock with the hold of the analogue machine for dynamic functioning though not for transfers to the Static Set Up Buffers. For completeness, the same type of programme controlled selector S could be used at D–A output as at A–D input. Further there are provided advance signals AS from the PDL to the CTU.

In order to make the whole process self-contained it is necessary to add to the A–D side a second group of Triggers fed by any external devices (these are no longer off-limit detectors) and used to address much programmes as those used for static setting up. The course of events is then as follows:

Supposing that the digital machine contains a large quantity of setting up data, it transfers the first block (dates and address) to its output memory locations and calls the Linkage Output Control. This unit is interlocked with the Slow Buffers and will thus transfer one addressed item of data to the appropriate Static Set-Up Buffer whenever the interlock is free. When the end of the data group is reached the Linkage Output Control will fire the appropriate trigger to recall the programme and reload the Output Memories. In this way the 7090 can with only a few microseconds work provide an output at the correct frequency for all connected units which can cover the entire set up phase for a problem. An additional very useful facility is the provision of programme set selector switches *s* at all inputs and outputs enabling programme controlled changes in the list of quantities treated by the digital machine.

The layout of the interpolating converter stage will now be described. According to FIG. 3, values Y1, W1, X1, X2 and X3 are fed from the respective storage locations of the Output Converter Buffer OCB (one section for one IC is shown only) to corresponding D–A Converters I to V. The first three converters form one interpolating converter of FIG. 2. As indicated the storage locations of the buffers can contain up to 15 or up to 10 bits respectively. Only Y1 must be converted with the full number of bits for maximum accuracy, since the $W1(X-X1)$ term can be maintained as a small correction term, and the accuracy requirements on the limits are notably less severe than on Y1.

It is for this reason that the above formula is not to be simplified as $Y=(Y1-W1X1)+W1X$ which would give the multiplicative term the same importance as the constant. Value Y is fed over the Output Amplifier OA to the analogue computer, value X is taken from the analogue computer.

The next point to note is the generation of the product term. As shown in the diagram all converters except converter II are fed directly by the analogue computer reference ($r$), but in the case of converter II, the problem variable X fed by the analogue computer over the amplifier A*s* replaces the reference. The Converters IV and V feed control signals CS (upper and lower variable limit) to the Control Trigger Unit CTU of the linkage in order to reset the triggers.

For functioning of the converters in the time delay mode of operation, according to FIG. 4, calculation can be saved by feeding directly converters I and II by $Y1$ and $Y2-Y1$ respectively and thence to an Integrator I$n$. The interpolation can thus be expressed by the equation $Y=Y1+T(Y2-X1)$. Converter II is connected to a time output T that varies between 0 and 1 at each step.

We claim:

1. Improvement in or relating to the functional linkage of a digital and an analog computer that form a hybrid system, the digital computer, comporting programme interrupt facilities controlled by its input- and output-channels, characterized in, that there is at least one register (OCB) which in the train of the transfer of a steady function's argument of the analog computer (AC) is fed by a digital computer output channel with data signifying characteristics of a straight line as well as of the limits, between which the function is to be replaced by the line, and that there is at least one interpolating converter (IC) connected via its input to said register and via its output to the analog computer, said interpolating converter being provided to simulate the function in dependence of the register content and of the argument of the function which is supplied preferably by the analog computer under steady control of the argument being covered by the limits set, the interruption of the digital computer and the charging of the register with a new straight line set being effected only, when the limits are exceeded.

2. Improvement according to claim 1, characterized in that the register (OCB) is provided to store the coordinates of one point and of the slope of the line as well as to the limits specifying arguments, whereby the number of register elements destinated to store the value of the function (means: $y$—coordinate) of said point is greater than the number of register elements destinated to store the other values respectively.

3. Improvement according to claim 1, characterized in that at least one input-channel of the digital computer is connected via an analog-digital converter (ADC) to analog track- and holdgates (THG), which themselves are supplied by signals the analog section and which ask for conversion only when some specific analog signals exceed limits which are furnished by the digital section this then changing said limits.

4. Improvement according to claim 1, comprising a multiplexer (ADMP) in the analog-digital branch of the linkage, between the analog computer output and an A–D converter (ADC), tied to the digital computer, and a multiplexer (DAMP) in the digital-analog branch of the linkage feeding a D–A converter (DAC) of the analog computer input, characterized in that digital computer section, consisting of a digital multiplexer (DMP) with a central processing unit (CPU) and a memory is interconnected within the digital data flow path between the A–D converter and the D–A multiplexer and that there is provided an A–D and a D–A control unit (ADCU and DACU), the first of which is connected over control triggers, to analog computer outputs and controls the A–D multiplexer with A–D converter unit, the central processing unit, and the digital multiplexer data input, the second of which is interconnected over the digital multiplexer and the digital to analog linear interpolating converters to analog computer inputs and controls the digital multiplexer but is controlled by the D–A multiplexer (DAMP) and the central processing unit, the latter and the memory being constantly in mutual control connection over the digital multiplexer, which is connected to the D–A multiplexer, and that there are interlocks between the A–D and D–A control units and the digital computer section to ensure groupwise data transfer.

5. Improvement according to claim 1, characterized in that the linear interpolating converters (IC) are connected to output conversion buffers (OCB) and function according to the relation $Y=Y1+W1(X-X1)$, where Y is the analog variable to be fed to the analog computer, W1 is the slope of the developed variable, X1, Y1 is a reference point of the slope, and X is the analog variable fed by the analog computer.

6. Improvement according to claim 3, characterized in that the A–D control unit (ADCU) comprises a first priority delay line (PDL) governing the sequence of analog channels to be converted, a second priority delay line (SPL), governing the signal sequence within a selected channel, a linkage addressing matrix (LAM) connected between a control trigger unit (CTU) and the second priority delay line on one hand, and between the first priority delay line and the track and hold gates unit (THG) which supply their output signals to the A–D multiplexer (ADMP), on the other hand, the control trigger unit and the track and hold gates unit being connected respectively to the same analog computer outputs.

7. Improvement according to claim 6, characterized in that there is provided an address input stepper (IAS) and an address output stepper (OAS) both operating on the digital multiplexer (DMP), the input stepper being controlled by the A–D control unit and the output stepper being controlled by the D–A control unit.

References Cited by the Examiner

UNITED STATES PATENTS

| | | | |
|---|---|---|---|
| 3,034,719 | 5/1962 | Anfinger et al. | 235—150.5 |
| 3,146,343 | 8/1964 | Young | 235—150.5 |

ROBERT C. BAILEY, *Primary Examiner.*

G. D. SHAW, *Assistant Examiner.*